(12) United States Patent
Hanai et al.

(10) Patent No.: US 11,409,255 B2
(45) Date of Patent: Aug. 9, 2022

(54) OUTPUT CONTROL APPARATUS

(71) Applicant: DENSO WAVE INCORPORATED, Aichi-pref. (JP)

(72) Inventors: Takashi Hanai, Chita-gun (JP); Takaaki Maekawa, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 387 days.

(21) Appl. No.: 16/752,731

(22) Filed: Jan. 27, 2020

(65) Prior Publication Data
US 2020/0301389 A1 Sep. 24, 2020

(30) Foreign Application Priority Data
Mar. 20, 2019 (JP) .............................. JP2019-052851

(51) Int. Cl.
*G05B 19/05* (2006.01)
*G05B 9/03* (2006.01)
*G06F 11/18* (2006.01)

(52) U.S. Cl.
CPC ............... *G05B 19/05* (2013.01); *G05B 9/03* (2013.01); *G06F 11/18* (2013.01)

(58) Field of Classification Search
CPC ........ G05B 19/05; G05B 9/03; G05B 19/054; G06F 11/18; G06F 11/2002

USPC .......................................................... 714/725
See application file for complete search history.

(56) References Cited

U.S. PATENT DOCUMENTS

2015/0180280 A1* 6/2015 Frampton ................. H02J 3/48
307/53
2019/0068004 A1* 2/2019 Louis ....................... H02J 50/12

FOREIGN PATENT DOCUMENTS

JP 2016-119117 A 6/2016

\* cited by examiner

*Primary Examiner* — James C Kerveros
(74) *Attorney, Agent, or Firm* — Harness, Dickey & Pierce, P.L.C.

(57) ABSTRACT

An output control apparatus that controls opening and closing between an output terminal connected to an external apparatus and a power supply terminal to which power for the external apparatus is supplied is provided. The output control apparatus includes a first switching element and a second switching element that are connected in series between the power supply terminal and the output terminal, a data generation portion that generates output data for turning on and off the first switching element and the second switching element based on a control command received from outside, a first controller that controls drive of the first switching element, and a second controller that controls drive of the second switching element.

6 Claims, 8 Drawing Sheets

OUTPUT CONTROL APPARATUS

CROSS REFERENCE TO RELATED APPLICATION

The present application claims the benefit of priority from Japanese Patent Application No. 2019-052851 filed on Mar. 20, 2019. The entire disclosures of all of the above applications are incorporated herein by reference.

TECHNICAL FIELD

The present disclosure relates to an output control apparatus that controls opening and closing between an output terminal connected to an external apparatus and a power supply terminal to which power for the external apparatus is supplied.

BACKGROUND

In a control apparatus such as a programmable logic controller; it may be necessary to duplicate control by its output module from the viewpoint of safety.

SUMMARY

According to the present disclosure, an output control apparatus that controls opening and closing between an output terminal connected to an external apparatus and a power supply terminal to which power for the external apparatus is supplied may be described. The output control apparatus may comprise a first switching element and a second switching element that are connected in series between the power supply terminal and the output terminal, a data generation portion that generates output data for turning on and off the first switching element and the second switching element based on a control command received from outside, a first controller that controls drive of the first switching element, and a second controller that controls drive of the second switching element.

BRIEF DESCRIPTION OF DRAWINGS

Objects, features and advantages of the present disclosure will become more apparent from the following detailed description made with reference to the accompanying drawings. In the drawings.

DETAILED DESCRIPTION

In a control apparatus such as a programmable logic controller, it may be necessary to duplicate control by its output module from the viewpoint of safety. In the present specification, a programmable logic controller may be abbreviated as a PLC. Examples of a control by an output module (corresponding to an output control) include application control of a power supply voltage such as a DC voltage to an output terminal to which an external apparatus such as a load is connected, for example.

To achieve duplication of output control, it may be conceivable to use an output module of a PLC including: two switching elements that open and close an energizing path to an output terminal from a power supply terminal to which a DC voltage is supplied; two micro controller units that control driving of the respective switching elements; a bus conversion IC that converts data given via an external bus communication line into output data compatible with serial communication and gives the data to the two micro controller units. A micro controller unit may be abbreviated as an MCU.

In this case, serial communication is performed between the bus conversion IC and the two MCUs. In this case, serial communication is also performed between the two MCUs, thereby achieving mutual monitoring between the MCUs. Specifically, the mutual monitoring is performed such that the respective MCUs present data received from the bus conversion IC and control signals for controlling driving of the corresponding switching elements generated based on the data to each other, and determine that the MCUs operate normally when the data and the control signals of the respective MCUs coincide with each other.

Examples of a method for reducing complexity of functional safety design of network apparatuses include a black channel approach. In a communication path recognized as a black channel, a communication error can be detected with a relatively high probability. As a result, a failure rate of the communication path may become negligibly small, so that a degree of freedom of module coupling may be improved. To be compatible with the black channel, a mechanism capable of reliably detecting a communication error on an application side may be required to be provided and certification of the communication error may also be required. To reduce labor (man-hours) for such certification (authentication), it may be preferable that the number of communication paths compatible with the black channel is as small as possible.

In the above described configuration, the communication paths in the output module include three communication paths that are a path between the bus conversion IC and one MCU, a path between the bus conversion IC and the other MCU, and a path between the two MCUs, Thus, to achieve black channel communication in the above configuration, authentication of a black channel may be required for each of the three communication paths. Thus, to reduce labor for authentication related to the black channel in the above configuration, it may be conceivable to modify the configuration such that the communication path between the bus conversion IC and the other MCU is eliminated and output data is supplied to the other MCU from the bus conversion IC via the one MCU.

In such a modified configuration, when one MCU fails, incorrect output data may be supplied to the other MCU due to the failure. In other words, in the above configuration, it cannot be said that the path via the one MCU is duplicated, Therefore, although the bus conversion IC outputs output data that originally instructs the switching element to be turned off, the output data received by the other MCU may be changed to an instruction to turn on the switching element due to the failure of the one MCU, and thus incorrect output control may be performed.

The present disclosure describes an output control apparatus capable of not only securing safety equivalent to safety in duplicated communication for output control but also reducing man-hours required for allowing a communication path to be compatible with a black channel.

According to one aspect of the present disclosure, an output control apparatus that controls opening and closing between an output terminal connected to an external apparatus and a power supply terminal to which power for the external apparatus is supplied is described. The output control apparatus may comprise: a first switching element and a second switching element that are connected in series between the power supply terminal and the output terminal; a data generation portion that generates output data for turning on and off the first switching element and the second switching element based on a control command received from outside; a first controller that controls drive of the first switching element; and a second controller that controls drive of the second switching element. The data generation portion includes a first generation-side calculation section that calculates based on one or more predetermined conversion original data including the output data, first code data detecting an error in the output data, and a second generation-side calculation section that calculates based on the one or more predetermined conversion original data including the output data, second code data detecting an error in the output data and being different from the first code data. The data generation portion transmits communication data acquired by adding the first code data and the second code data to the output data to the first controller by serial communication. The first controller includes a first control-side calculation section that has only calculation functions similar to calculation function of the first generation-side calculation section between calculation functions of the first generation-side calculation section and of the second generation-side calculation section; a first error detection section that detects the error in the output data included in the communication data based on a calculation result of the first control-side calculation section, and a first drive portion that drives the first switching element based on the output data on condition that no error in the output data is detected by the first error detection section. The first controller transmits the communication data received from the data generation portion to the second controller by serial communication. The second controller includes a second control-side calculation section that has the calculation functions similar to the calculation functions in the second generation-side calculation section; a second error detection section that detects the error in the output data included in the communication data based on a calculation result of the second control-side calculation section, and a second drive portion that drives the second switching element based on the output data on condition that no error in the output data is detected by the second error detection section.

According to another aspect of the present disclosure, an output control apparatus may comprise: an output terminal that is connected to an external apparatus; a power supply terminal to which power for the external apparatus is supplied; a first switching element and a second switching element that are connected in series between the power supply terminal and the output terminal; such that the output control apparatus controlling opening and closing between the output terminal and the power supply terminal; a data generation portion that is configured to generate output data for turning on and off the first switching element and the second switching element based on a control command; and a first controller and a second controller that are configured to respectively control drive of the first switching element and the second switching element. The data generation portion is configured to calculate based on one or more predetermined conversion original data including the output data, first code data detecting an error in the output data, calculate based on the one or more predetermined conversion original data including the output data, second code data detecting an error in the output data, the second code data being different from the first code data, add the first code data and the second code data to the output data to acquire communication data, and transmit the communication data to the first controller. The first controller is configured to calculate based on the one or more predetermined conversion original data, only the first code data between the first code data and the second code data, detect the error in the output data included in the communication data based on a calculation result of the first controller, and transmit the communication data to the second controller. The first controller includes a first drive portion that drives the first switching element based on the output data on condition that no error in the output data is detected by the first controller. The second controller is configured to calculate based on the one or more predetermined conversion original data, the second code data, detect an error in the output data included in the communication data based on a calculation result of the second controller. The second controller includes a second drive portion that drives the second switching element based on the output data on condition that no error in the output data is detected by the second controller.

In this case, a data generation portion transmits communication data including output data generated to a first controller using serial communication. The first controller transmits the communication data received from the data generation portion to a second controller using serial communication. That is, in this case, a communication path from the data generation portion to the second controller via the first controller is not duplicated. As described above, in the above configuration, the communication path in the output control apparatus is not physically duplicated. In the above configuration, each part has functions as follows to achieve semantic duplication for achieving functions equivalent to physical duplication.

That is, the data generation portion includes a first generation-side calculation section that calculates first code data that is a code for detecting an error in the output data based on predetermined conversion original data including the output data, and a second generation-side calculation section that calculates second code data that is a code for detecting an error in output data based on predetermined conversion original data including the output data and that is different from the first code data. The data generation portion transmits communication data obtained by adding the first code data and the second code data to the output data to the first controller using serial communication.

The first controller includes a first control-side calculation section having calculation functions similar to the first generation-side calculation section, a first error detection section that detects an error in the output data included in the communication data using a calculation result of the first control-side calculation section, and a first drive portion that drives the first switching element based on the output data on condition that no error in the output data is detected by the first error detection section. The second controller includes a second control-side calculation section having calculation functions similar to the second generation-side calculation section, a second error detection section that detects an error in the output data included in the communication data using a calculation result of the second control-side calculation section, and a second drive portion that drives the second switching element based on the output data on condition that no error in the output data is detected by the second error detection section.

According to such a configuration, when data corruption occurs in the communication data in a stage of transmission from the data generation portion to the first controller, one or both of the first error detection section of the first controller and the second error detection section of the second controller detect an error in output data (corresponding to a communication error). Thus, drive of the first switching element and the second switching element is prevented from being controlled based on incorrect output data. As a result, it is possible to prevent from occurring a situation where the power supply terminal and the output terminal are controlled to be in an incorrect open-and-close state.

In the above configuration, when a failure occurs in the first controller, the failure may cause data corruption in output data included in the communication data transmitted from the first controller to the second controller. In this case, the first control-side calculation section of the first controller does not have calculation functions similar to the second generation-side calculation section. Thus, the first controller cannot process (change) the second code data included in the communication data to be transmitted to the second controller. Accordingly, the communication data is extremely unlikely to be falsified as a chain reaction due to the failure of the first controller. As a result the second code data included in the communication data to be transmitted to the second controller remains in true data generated in the data generation portion.

Accordingly, even when data corruption occurs in the output data included in the communication data to be transmitted to the second controller, an error in the output data (communication error) is detected by the second error detection section of the second controller. This prevents drive of the second switching element from being controlled based on incorrect output data. As a result, it is possible to prevent from occurring a situation where a section between the power supply terminal and the output terminal is controlled to be in an incorrect open-and-close state.

According to the above configuration, functions as in a configuration in which the communication paths in the output control apparatus are physically duplicated, specifically, detection of a communication error and response when a communication error occurs, can be achieved. In addition, in the above configuration, the output control apparatus includes only two communication paths that are a path between the data generation portion and the first controller and a path between the first controller and the second controller. In other words, according to the above configuration, it is possible to reduce the number of communication paths from three to two compared to a configuration of physical duplication, and labor (man-hours) of authentication required to be compatible with a black channel can be reduced accordingly. Thus, the above configuration enables obtaining excellent effect of not only securing safety equivalent to safety in duplicated communication for output control but also reducing man-hours required for allowing the communication path to be compatible with a black channel.

In the output control apparatus, the first generation-side calculation section and the second generation-side calculation section may calculate the first code data and the second code data, respectively, based on different conversion original data. Thus, in this case, the first code data and the second code data may differ in not only their calculation methods, but also their original data. This case causes the first control-side calculation section having only calculation functions similar to the first generation-side calculation section to be more difficult to calculate the second code data. Thus, according to the above configuration, when the first controller fails, it is possible to further suppress a possibility that the second code data included in the communication data is falsified as a chain reaction due to the failure.

An embodiment of the present disclosure will be described with reference to the drawings.

(General Configuration)

Figure 1:
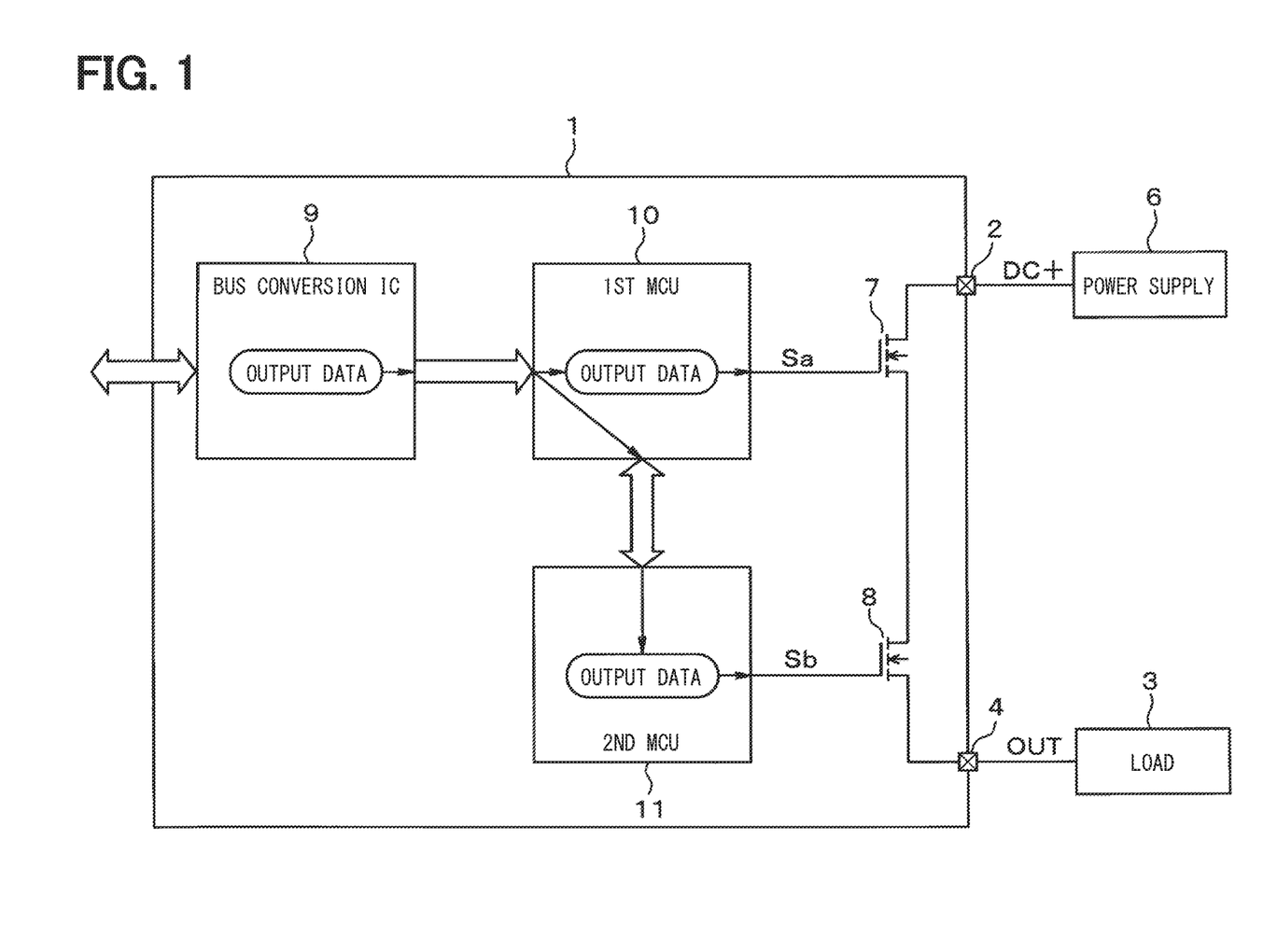
FIG. 1 is a diagram schematically illustrating a configuration of an output module according to an embodiment.

As illustrated in FIG. 1, an output module 1 corresponding to an output control apparatus includes a power supply terminal 2 to which a DC voltage DC+ corresponding to a power supply for an external apparatus is applied, and an output terminal 4 connected to a load 3 corresponding to an external apparatus. The output module 1 constitutes a PLC together with other output modules, a controller, and the like, which are not illustrated. The DC voltage DC+ is generated by the output module 1, for example, and eventually by a load power supply 6 provided outside the PLC.

The output module 1 controls opening and closing between the power supply terminal 2 and the output terminal 4. The output module 1 includes a first switching element 7, a second switching element 8, a bus conversion IC 9, a first MCU 10, and a second MCU 11, In the following description, the first switching element 7 and the second switching element 8 are abbreviated as switching elements 7 and 8, respectively. The first MCU 10 and the second MCU 11 are abbreviated as MCUs 10 and 11, respectively.

The switching elements 7 and 8 are each an FET of an electronic switch, and are connected in series between the power supply terminal 2 and the output terminal 4. Specifically, one main terminal of the switching element 7 is connected to the power supply terminal 2. The other main terminal is connected to one main terminal of the switching element 8. The other main terminal of the switching element 8 is connected to the output terminal 4. The switching element 7 has a switching control terminal that receives a control signal Sa output from the MCU 10. The switching element 8 has a switching control terminal that receives a control signal Sb output from the MCU 11.

The configuration described above allows the MCU 10 to control drive of the switching element 7 and the MCU 11 to control drive of the switching element 8, The control signals Sa and Sb output from the MCU 10 and the MCU 11, respectively, are similar signals at a normal time when no communication error occurs. Thus; at the normal time, when one of the switching elements 7 and 8 is turned on, the other is also turned on. At the normal time, when one of them is turned off, the other is also turned off. That is, at the normal time, the switching elements 7 and 8 are turned on and off in a similar manner.

The bus conversion IC 9 receives data including a control command for turning on and off the switching elements 7 and 8 from the outside of the output module 1 via a bus communication line. Communication via the bus communication line is in conformity with an industrial network standard such as Ethernet/IP, EtherCAT, PROFINET, or the like. Communication via the bus communication line may be based on any communication in conformity with an industrial network standard such as Ethernet/IP, EtherCAT, PROFINET, or the like. The bus conversion IC 9 converts the data into output data compatible with serial communication. That is, the bus conversion IC 9 generates output data for turning on and off the switching elements 7 and 8 based on a control command received from the outside. The bus conversion IC 9 corresponds to a data generation portion. The bus conversion IC 9 transmits communication data including the generated output data to the MCU 10 by serial communication.

The MCU 10 controls drive of the switching element 7 based on the communication data received from the bus conversion IC 9. The MCU 10 also generates the same data as the communication data received from the bus conversion IC 9, and transmits the generated communication data to the MCU 11 by serial communication. The MCU 11 controls drive of the switching element 8 based on the communication data received from the MCU 10.

Between the MCUs 10 and 11, serial communication is performed, thereby achieving mutual monitoring between the MCUs 10 and 11. Specifically, the mutual monitoring is performed such that the respective MCUs 10 and 11 present the output data received from the bus conversion IC 9 and the control signals Sa and Sb generated based on the output data to each other, and determine that the MCUs operate normally when the output data and the control signals of the respective MCUs coincide with each other.

(Specific Configuration of Output Module)

Figure 2:
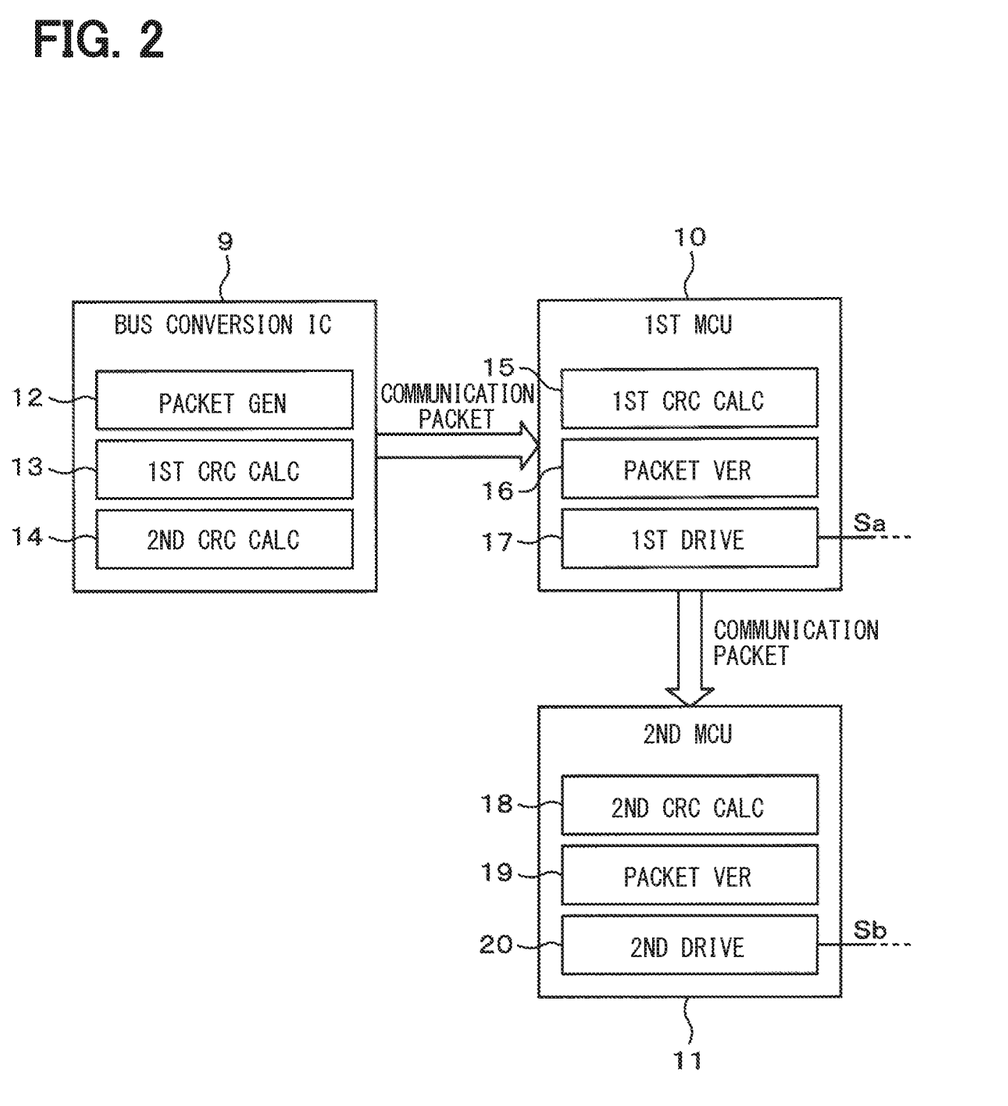
FIG. 2 is a diagram schematically illustrating a specific configuration example of an output module according to an embodiment.

Specific configurations of the bus conversion IC 9, and the MCUs 10 and 11 of the output module 1 are as illustrated in FIG. 2, for example. As illustrated in FIG. 2, the bus conversion IC 9 includes a communication-packet generation section 12, a first CRC calculation section 13, and a second CRC calculation section 14. These parts may be each realized by software processing. The communication-packet generation section 12 generates communication data to be transmitted to the MCU 10.

Figure 3:
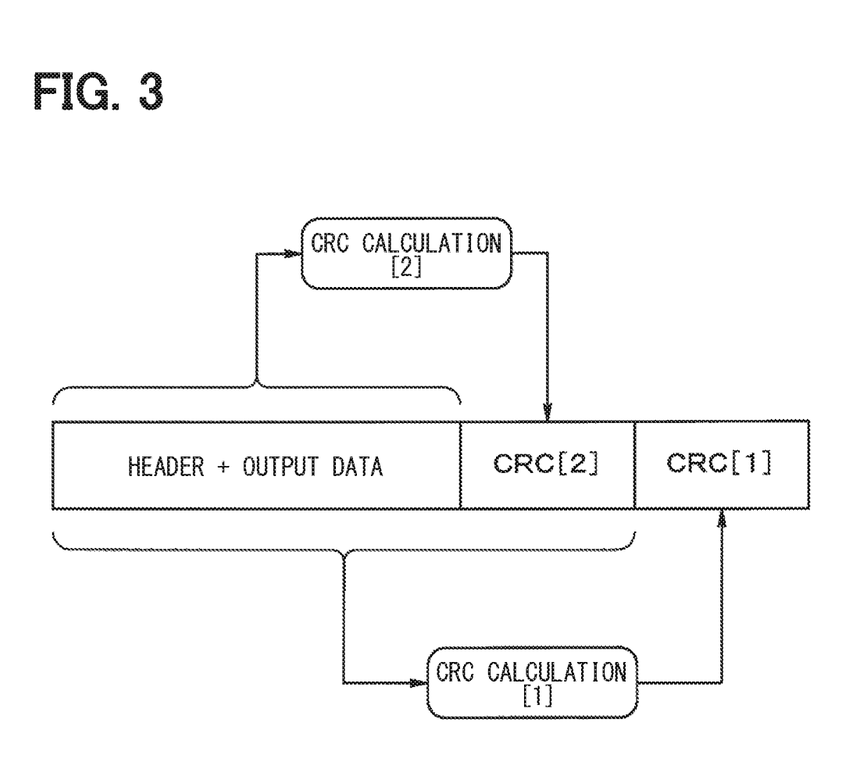
FIG. 3 is a diagram schematically illustrating an example of structure of communication data according to an embodiment.

In this case, the communication data (communication packet) has structure as illustrated in FIG. 3. As illustrated in FIG. 3, the communication data generated by the communication-packet generation section 12 includes a header and output data, CRC [2], and CRC [1]. The CRC [1] corresponds to first code data that is a code for detecting an error in the output data. The CRC [1] is calculated by the first CRC calculation section 13.

The CRC [2] is a code for detecting an error in the output data and corresponds to second code data different from the first code data. The CRC [2] is calculated by the second CRC calculation section 14. The bus conversion IC 9 transmits communication data having data structure as described above to the MCU 10. That is, the bus conversion IC 9 transmits communication data obtained by adding the CRC [1] and the CRC [2] to the output data to the MCU 10 by serial communication.

The first CRC calculation section 13 generates, for example, the CRC [1] that is a signature of "header+output data" using advanced calculation (CRC calculation [1] in FIG. 3) such as CRC. The term CRC is abbreviation for cyclic redundancy checking. That is, the first CRC calculation section 13 calculates the CRC [1] based on predetermined conversion original data including output data. The first CRC calculation section 13 corresponds to a first generation-side calculation section. In this case, the conversion original data is the "header+output data" and the CRC [2]. The "header+output data" and the CRC [2]" as the conversion original data may be an example of a first conversion original data.

The second CRC calculation section 14 generates the CRC [2] that is a signature of "header+output data" using advanced calculation such as CRC (CRC calculation [2] in FIG. 3). That is, the second CRC calculation section 14 calculates the CRC [2] based on predetermined conversion original data including output data. The second CRC calculation section 14 corresponds to a second generation-side calculation section. In this case, the conversion original data is the "header+output data". The "header+output data" as the conversion original data may be an example of a second conversion original data.

Figure 4:
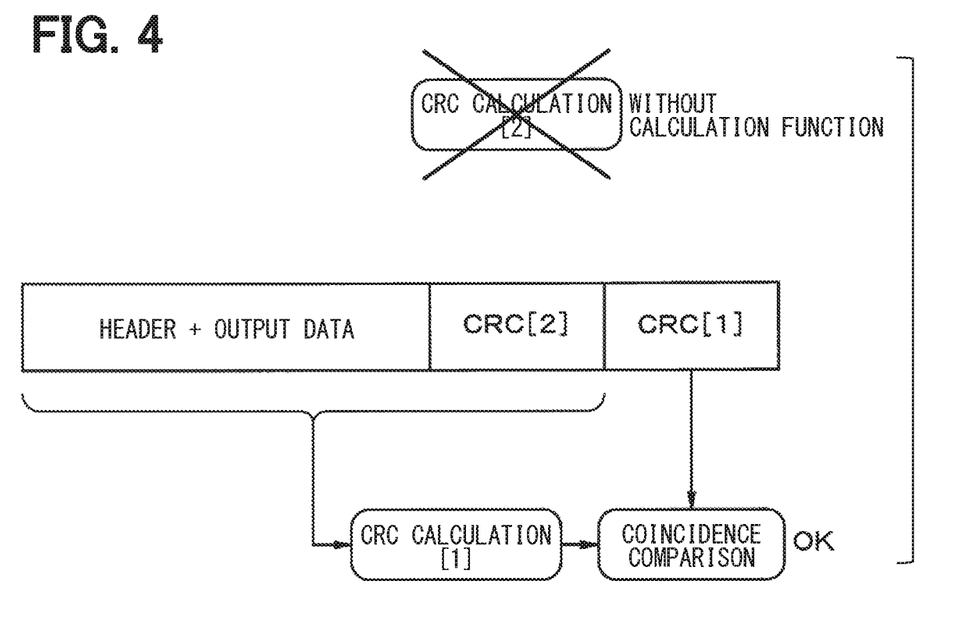
FIG. 4 is a diagram for illustrating contents of software processing in a first MCU according to an embodiment.

The MCU 10 includes a first CRC calculation section 15, a communication-packet verification section 16, and a first drive portion 17. The first CRC calculation section 15 and the communication-packet verification section 16 may be realized by software processing. The first CRC calculation section 15 can perform calculation similar to the first CRC calculation section 13 included in the bus conversion IC 9. Specifically, as illustrated in FIG. 4, the first CRC calculation section 15 can perform CRC calculation [1] for calculating CRC [1] based on "header+output data" and CRC [2] included in communication data. However, the first CRC calculation section 15 cannot perform calculation similar to the second CRC calculation section 14 included in the bus conversion IC 9, i.e., the CRC calculation [2].

While having calculation functions similar to the first CRC calculation section 13 included in the bus conversion IC 9, the MCU 10 does not have calculation functions similar to the second CRC calculation section 14. In other words, while software for the CRC calculation [1] for calculating the CRC [1] is installed in the MCU 10, software for the CRC calculation [2] for calculating the CRC [2] is not installed therein. As described above, in the present embodiment, the MCU 10 is intentionally configured not to have ability to calculate the CRC [2]. The reason for this will be described later.

The communication-packet verification section 16 verifies communication data received from the bus conversion IC 9 using a calculation result of the first CRC calculation section 15 to detect an error in output data included in the communication data. The communication-packet verification section 16 corresponds to a first error detection section. Specifically, as illustrated in FIG. 4, the first CRC calculation section 15 performs the CRC calculation [1] described above on the communication data received from the bus conversion IC 9 to obtain the CRC [1].

The communication-packet verification section 16 performs coincidence comparison between the CRC [1] included in the communication data and the CRC [1] calculated by the first CRC calculation section 15. The communication-packet verification section 16 determines that the output data is normal (no error in the output data is detected) when the result of the coincidence comparison is OK, i.e., when the two CRCs [1] are the same data. The communication-packet verification section 16 determines that the output data is abnormal (an error in the output data is detected) when the result of the coincidence comparison is NG, i.e., when the two CRCs [1] are different data.

The first drive portion 17 drives the switching element 7 based on the output data on condition that no error in the output data is detected by the communication-packet verification section 16. Specifically, when the result of the coincidence comparison performed by the communication-packet verification section 16 is OK, the first drive portion 17 generates a control signal Sa based on contents of a control command represented by the output data included in the communication data received from the bus conversion IC 9 and outputs the control signal Sa. Accordingly, the switching element 7 is controlled to an on or off state based on a control command received from the outside.

When the result of the coincidence comparison performed by the communication-packet verification section 16 is NG, the first drive portion 17 generates a control signal Sa for turning off the switching element 7 and outputs the control signal Sa regardless of contents of a control command represented by the output data included in the communication data received from the bus conversion IC 9. Accordingly, the switching element 7 is forcibly controlled to be turned off regardless of a control command received from the outside. The MCU 10 is configured to perform fail-safe control as described above when a communication error is detected.

Figure 5:
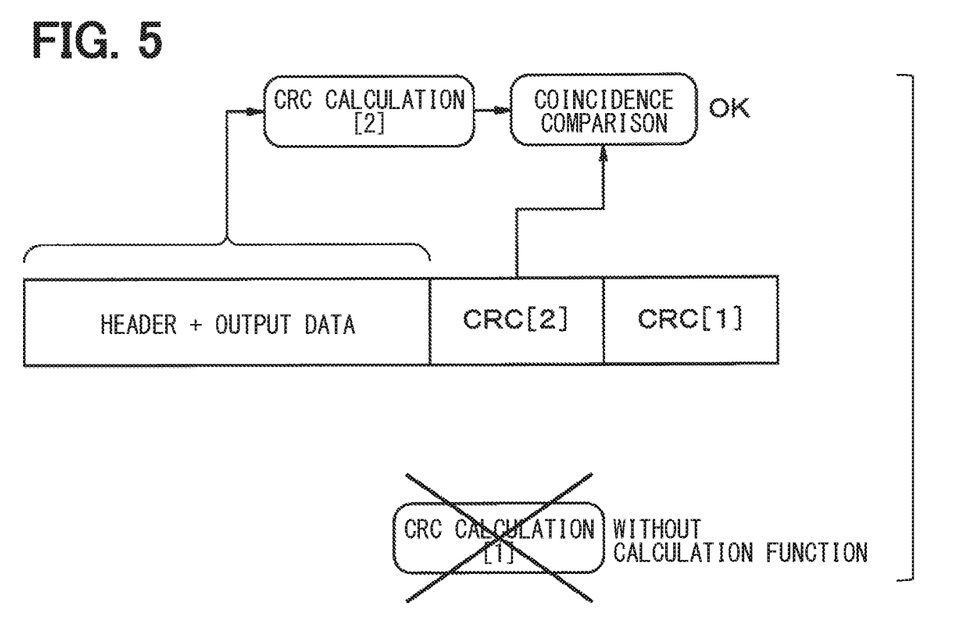
FIG. 5 is a diagram for illustrating contents of software processing in a second MCU according to an embodiment.

The MCU 11 includes a second CRC calculation section 18, a communication-packet verification section 19, and a second drive portion 20. The second CRC calculation section 18 and the communication-packet verification section 19 may be realized by software processing. The second CRC calculation section 18 can perform calculation similar to the second CRC calculation section 14 included in the bus conversion IC 9. Specifically, as illustrated in FIG. 5, the second CRC calculation section 18 can perform the CRC calculation [2] for calculating the CRC [2] based on "header+output data" included in communication data. However, the second CRC calculation section 18 cannot perform calculation similar to the first CRC calculation section 13 included in the bus conversion IC 9.

While having calculation functions similar to the second CRC calculation section 14 included in the bus conversion IC 9, the MCU 11 does not have calculation functions similar to the first CRC calculation section 13. In other words, in the present embodiment, while the software for the CRC calculation [2] for calculating the CRC [2] is installed in the MCU 11, the software for the CRC calculation [1] for calculating the CRC [1] is not installed therein. The software for the CRC calculation [1] may be installed in the MCU 11.

The communication-packet verification section 19 verifies communication data received from the MCU 10 using a calculation result of the second CRC calculation section 18 to detect an error in output data included in the communication data, and corresponds to a second error detection section. Specifically, as illustrated in FIG. 5, the second CRC calculation section 18 performs the CRC calculation [2] described above on the communication data received from the MCU 10 to obtain the CRC [2].

The communication-packet verification section 19 performs coincidence comparison between the CRC [2] included in the communication data and the CRC [2] calculated by the second CRC calculation section 18. The communication-packet verification section 19 determines that the output data is normal (no error in the output data is detected) when the result of the coincidence comparison is OK, i.e., when the two CRCs [2] are the same data. The communication-packet verification section 19 determines that the output data is abnormal (an error in the output data is detected) when the result of the coincidence comparison is NG, i.e., when the two CRCs [2] are different data.

The second drive portion 20 drives the switching element 8 based on the output data on condition that no error in the output data is detected by the communication-packet verification section 19. Specifically, when the result of the coincidence comparison performed by the communication-packet verification section 19 is OK, the second drive portion 20 generates a control signal Sb based on contents of a control command represented by the output data included in the communication data received from the MCU 10 and outputs the control signal Sb. Accordingly, the switching element 8 is controlled to an on or off state based on a control command received from the outside.

When the result of the coincidence comparison performed by the communication-packet verification section 19 is NG, the second drive portion 20 generates a control signal Sb for turning off the switching element 8 and outputs the control signal Sb regardless of contents of a control command represented by the output data included in the communication data received from the MCU 10. Accordingly, the switching element 8 is forcibly controlled to be turned off regardless of a control command received from the outside. The MCU 11 is configured to perform fail-safe control as described above when a communication error is detected.

Operation of the present embodiment will be described.

(1) Normal Operation Pattern

When there is no data corruption in communication data in both a stage of transmission from the bus conversion IC 9 to the MCU 10 and a stage of transmission from the MCU 10 to the MCU 11, i.e., at a normal time, the MCUs 10 and 11 operate as follows.

The first CRC calculation section 15 of the MCU 10 obtains the CRC [1] by performing the CRC calculation [1]. Then, the communication-packet verification section 16 of the MCU 10 performs coincidence comparison between the CRC [1] included in the communication data and the CRC [1] obtained by the first CRC calculation section 15. In this case, no data corruption occurs in the communication data, so that a result of the coincidence comparison is OK. Thus, the first drive portion 17 of the MCU 10 generates and outputs a control signal Sa based on contents of a control command represented by the output data.

The second CRC calculation section 18 of the MCU 11 obtains the CRC [2] by performing the CRC calculation [2]. Then, the communication-packet verification section 19 of the MCU 11 performs coincidence comparison between the CRC [2] included in the communication data and the CRC [2] obtained by the second CRC calculation section 18. In this case, no data corruption occurs in the communication data, so that a result of the coincidence comparison is OK. Thus, the second drive portion 20 of the MCU 11 generates and outputs a control signal Sb based on contents of a control command represented by the output data. Operation as described above causes each of the switching elements 7 and 8 to be turned on and off in a similar manner in accordance with a control command received from the outside at a normal time.

(2) Communication Failure Detection Pattern 1

Figure 6:
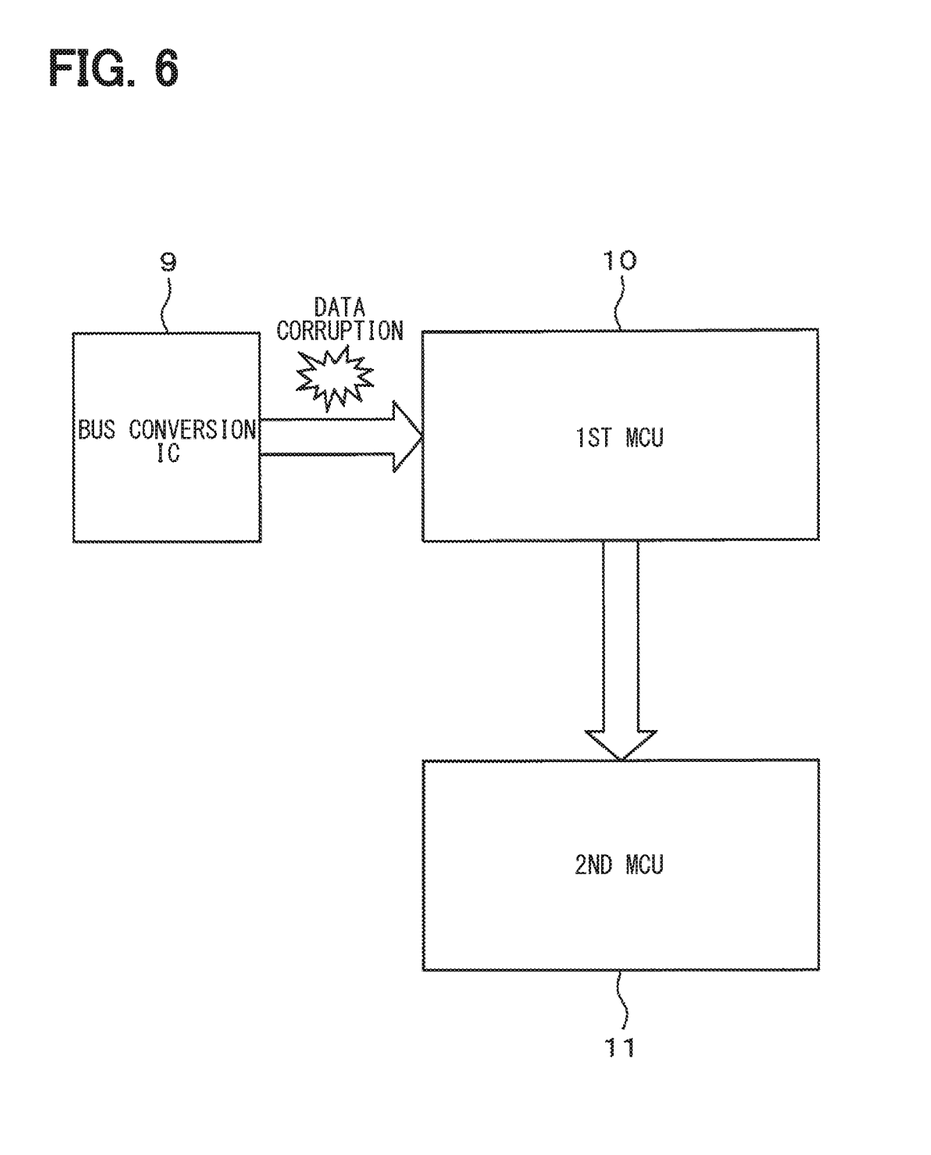
FIG. 6 is a diagram for illustrating data corruption of communication data transmitted from a bus conversion IC to a first MCU according to an embodiment.
Figure 7:
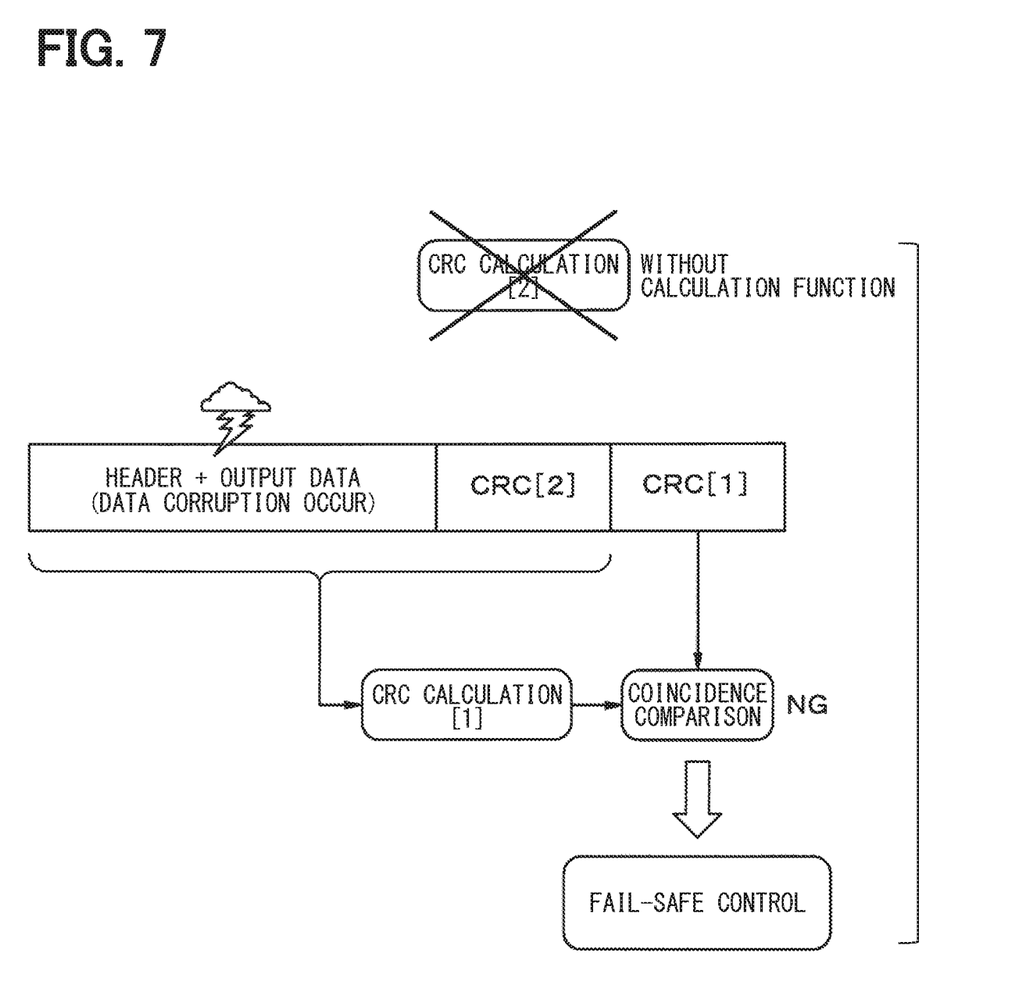
FIG. 7 is a diagram for illustrating an overview of fail-safe control by a first MCU according to an embodiment.

As illustrated in FIG. 6, operation of the MCUs 10 and 11 when data corruption occurs in the communication data in the stage of transmission from the bus conversion IC 9 to the MCU 10 is as follows. Even in this case, as illustrated in FIG. 7, the first CRC calculation section 15 of the MCU 10 obtains the CRC [1] by performing the CRC calculation [1] as in a normal operation pattern. Then, the communication-packet verification section 16 of the MCU 10 performs coincidence comparison between the CRC [1] included in the communication data and the CRC [1] obtained by the first CRC calculation section 15.

In this case, the communication data ("header+output data") received from the bus conversion IC 9 includes data corruption. Thus, the CRC [1] obtained by the first CRC calculation section 15 is different from the CRC [1] included in the communication data, and a result of coincidence comparison is NG. The first drive portion 17 of the MCU 10 then generates and outputs a control signal Sa for turning off the switching element 7 regardless of contents of a control command represented by the output data (fail-safe control).

Figure 8:
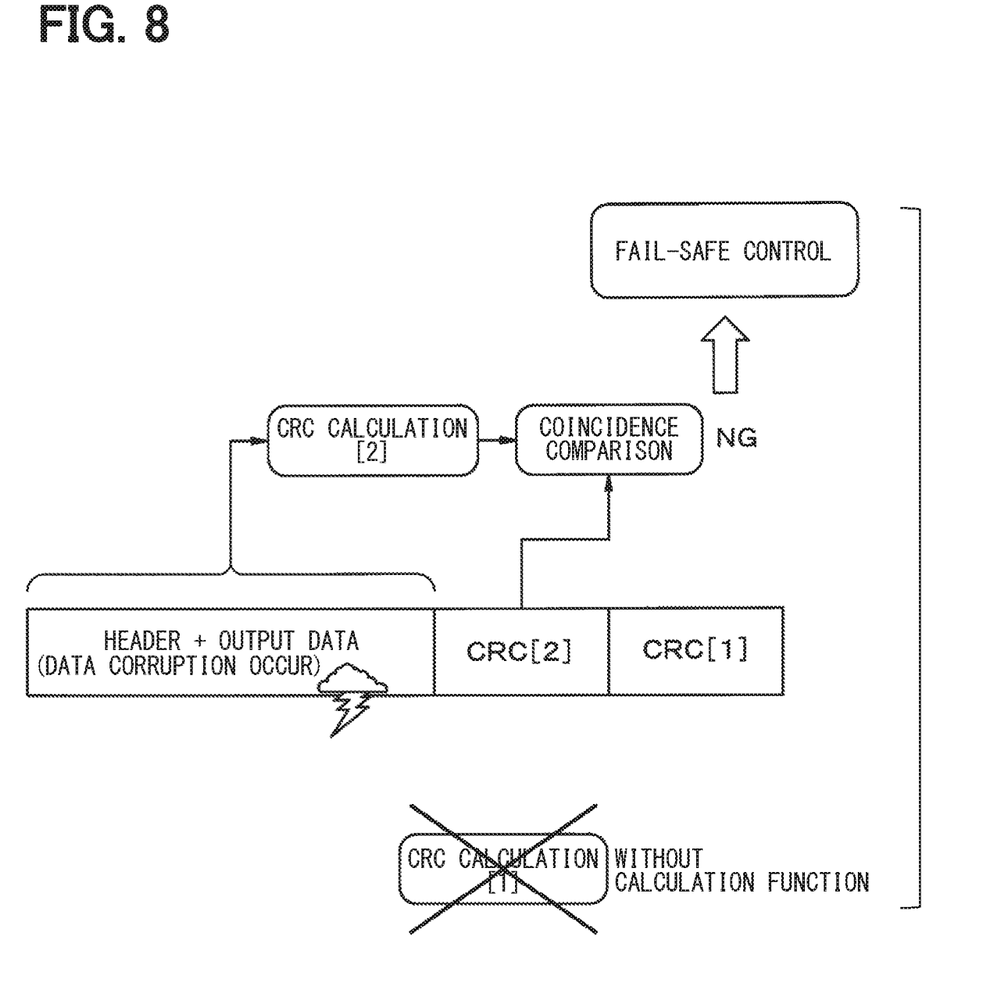
FIG. 8 is a diagram for illustrating an overview of fail-safe control by a second MCU according to an embodiment.

Even in this case, as illustrated in FIG. 8, the second CRC calculation section 18 of the MCU 11 obtains the CRC [2] by performing the CRC calculation [2] as in the normal operation pattern. Then, the communication-packet verification section 19 of the MCU 11 performs coincidence comparison between the CRC [2] included in the communication data and the CRC [2] obtained by the second CRC calculation section 18.

In this case, the communication data ("header+output data") received from the MCU 10 includes data corruption. Thus, the CRC [2] obtained by the second CRC calculation section 18 is different from the CRC [2] included in the communication data, and a result of coincidence comparison is NG. The second drive portion 20 of the MCU 11 then generates and outputs a control signal Sb for turning off the switching element 8 regardless of contents of a control command represented by the output data (fail-safe control).

(3) Communication Failure Detection Pattern 2

Figure 9:
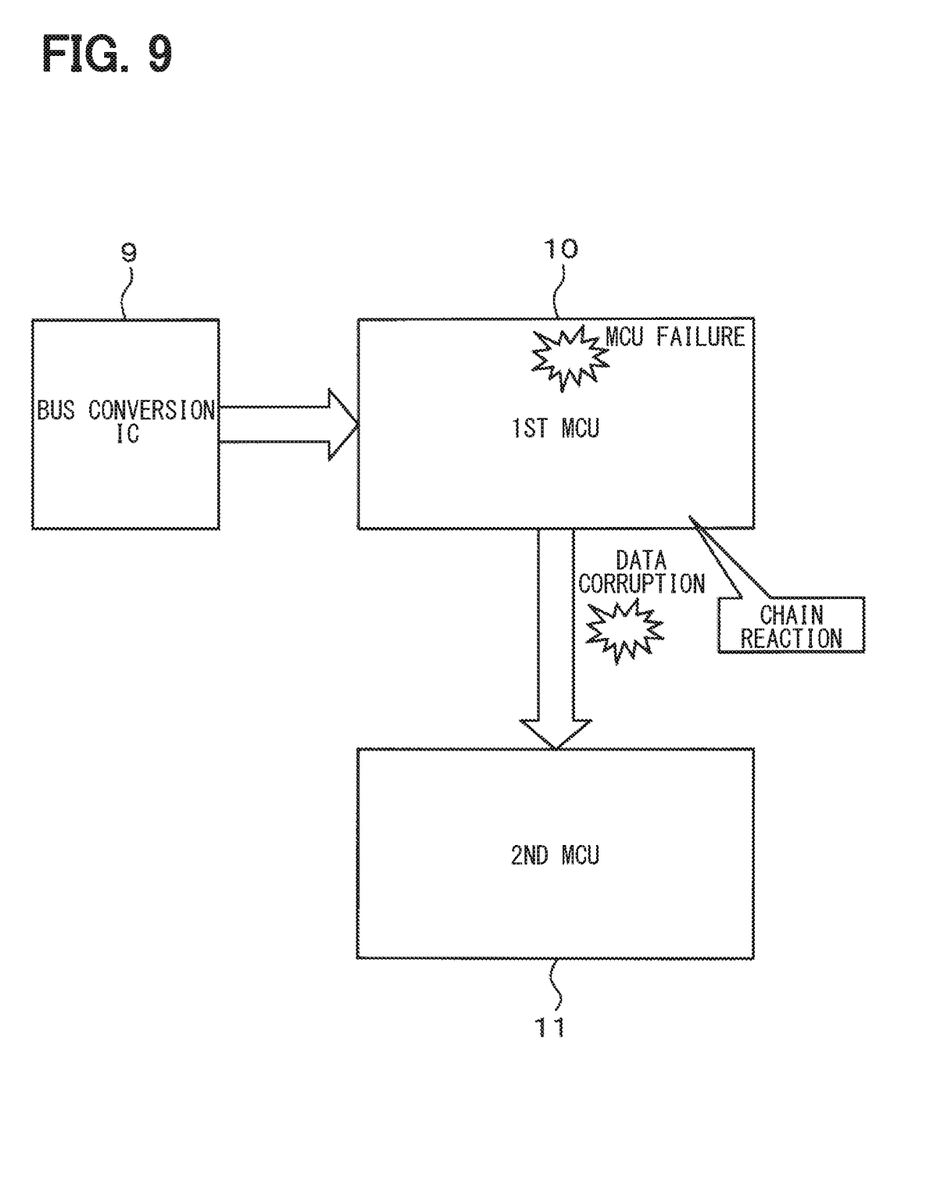
FIG. 9 is a diagram for illustrating data corruption of communication data due to a failure of a first MCU according to an embodiment.

As illustrated in FIG. 9, when a failure occurs in the MCU 10, the failure may cause data corruption in the communication data in the stage of transmission from the MCU 10 to the MCU 11. In a case as described above, the MCUs 10 and 11 operate as follows. The MCU 10 has failed in this case, so that the MCU 10 does not always perform operation that may be assumed in design, and may perform unknown operation. This may cause the MCU 10 to perform control of turning on the switching element 7 even though a control command received from the outside includes contents for instructing the switching element 7 to be turned off.

In this case, the MCU 10 does not have a calculation function for performing the CRC calculation [2], so that the CRC [2] included in the communication data cannot be processed. Thus, the CRC [2] included in the communication data is extremely unlikely to be falsified as a chain reaction due to the failure of the MCU 10. The CRC [2] included in the communication data transmitted from the MCU 10 to the MCU 11 then remains in true data generated in the bus conversion IC 9.

Even in this case, as illustrated in FIG. 8, the second CRC calculation section 18 of the MCU 11 obtains the CRC [2] by performing the CRC calculation [2] as in the normal operation pattern. Then, the communication-packet verification section 19 of the MCU 11 performs coincidence comparison between the CRC [2] included in the communication data and the CRC [2] obtained by the second CRC calculation section 18.

In this case, the communication data ("header+output data") received from the MCU 10 includes data corruption. Thus, the CRC [2] obtained by the second CRC calculation section 18 is different from the CRC [2] included in the communication data, and a result of coincidence comparison is NG. The second drive portion 20 of the MCU 11 then generates and outputs a control signal Sb for turning off the switching element 8 regardless of contents of a control command represented by the output data (fail-safe control).

As described above, according to the present embodiment, the following effects may be obtained, for example.

The output module 1 of the present embodiment includes the switching elements 7 and 8 that are connected in series between the power supply terminal 2 and the output terminal 4, and that are turned on and off in a similar manner, and thus is configured to have a duplicated output stage. In this case, a communication path from the bus conversion IC 9 to the MCU 11 via the MCU 10 is not duplicated. As described above, in the above configuration, the communication path in the output module 1 is not physically duplicated.

Each part has functions as follows to achieve semantic duplication for achieving functions equivalent to physical duplication. That is, the bus conversion IC 9 includes the first CRC calculation section 13 that calculates the CRC [1] and the second CRC calculation section 14 that calculates the CRC [2] different from the CRC [1], and transmits communication data acquired by adding the CRC [1] and the CRC [2] to output data to the MCU 10 by serial communication.

The MCU 10 includes the first CRC calculation section 15 having calculation functions similar to the first CRC calculation section 13, the communication-packet verification section 16 that detects an error in output data using a calculation result of the first CRC calculation section 15, and the first drive portion 17 that drives the switching element 7 based on the output data on condition that no error in the output data is detected by the communication-packet verification section 16. The MCU 11 includes the second CRC calculation section 18 having calculation functions similar to the second CRC calculation section 14, the communication-packet verification section 19 that detects an error in output data using a calculation result of the second CRC calculation section 18, and the second drive portion 20 that drives the switching element 8 based on the output data on condition that no error in the output data is detected by the communication-packet verification section 19.

According to such a configuration, when data corruption occurs in the communication data in a stage of transmission from the bus conversion IC 9 to the MCU 10, one or both of the communication-packet verification section 16 of the MCU 10 and the communication-packet verification section 19 of the MCU 11 detect an error (communication error) in the output data. This prevents drive of the switching elements 7 and 8 from being controlled based on incorrect output data. As a result, a situation where a section between the power supply terminal 2 and the output terminal 4 is controlled to be in an incorrect open-and-close state is prevented from occurring.

In the above configuration, when a failure occurs in the MCU 10, the failure may cause data corruption in output data included in the communication data transmitted from the MCU 10 to the MCU 11. However, in this case, the first CRC calculation section 15 of the MCU 10 does not have calculation functions similar to the second CRC calculation section 14 of the bus conversion IC 9. Thus, the MCU 10 cannot process (change) the CRC [2] included in the communication data to be transmitted to the MCU 11.

Accordingly, the communication data is extremely unlikely to be falsified as a chain reaction due to the failure of the MCU 10. The CRC [2] included in the communication data transmitted from the MCU 10 to the MCU 11 then remains in true data generated in the bus conversion IC 9. The "falsifying of communication data" described above includes meaning of causing even output data including data corruption included in communication data to be seen as if correct data in which no data corruption occurs in the output data when CRC [2] included in the same communication data is changed.

For this reason, even when data corruption occurs in output data included in communication data transmitted to the MCU 11, the communication-packet verification section 19 of the MCU 11 can reliably detect an error in the output data (communication error) without being affected by a failure of the MCU 10. This prevents drive of the switching element 8 from being controlled based on incorrect output data. As a result, it is possible to prevent from occurring a situation where a section between the power supply terminal 2 and the output terminal 4 is controlled to be in an incorrect open-and-close state.

According to the above configuration, functions as in a configuration in which the communication paths in the output module 1 are physically duplicated, specifically, detection of a communication error and response when a communication error occurs, can be achieved. In addition, in the above configuration, the output module 1 includes only two communication paths that are a path between the bus conversion IC 9 and the MCU 10, and a path between the MCU 10 and the MCU 11. In other words, according to the above configuration, the number of communication paths can be reduced from three to two compared to a configuration of physical duplication, and labor (man-hours) of authentication required to be compatible with a black channel is reduced accordingly. Thus, the above configuration enables obtaining excellent effect of not only securing safety equivalent to safety in duplicated communication for output control but also reducing man-hours required for allowing the communication path to be compatible with a black channel.

As described above, the output module 1 has a configuration for detecting a communication error (data corruption) using CRC [1] and CRC [2], including the first CRC calculation section 13, the second CRC calculation section 14, the first CRC calculation section 15, the communication-packet verification section 16, the second CRC calculation section 18, the communication-packet verification section 19, and the like. Thus, according to the above configuration, a mechanism to be compatible with a black channel (a mechanism that can reliably detect a communication error on the application side) is fabricated, so that such a mechanism is not required to be separately provided.

In the present embodiment, the first CRC calculation section 13 (CRC calculation [1]) and the second CRC calculation section 14 (CRC calculation [2]) are configured to calculate CRC [1] and CRC [2], respectively, based on different conversion original data. Thus, in this case, the CRC [1] and the CRC [2] differ in not only their calculation methods, but also their original data.

This case causes the MCU 10 having only calculation functions similar to the first CRC calculation section 13 to be more difficult to calculate the CRC [2]. Thus, according to the above configuration, when the MCU 10 fails, possibility that the CRC [2] included in the communication data is falsified as a chain reaction due to the failure can be further suppressed. As a result, fail-safe control can be performed more reliably on an MCU 11 side.

Other Embodiments

The present disclosure is not limited to the embodiments described above and illustrated in the drawings, and can be arbitrarily modified, combined, or expanded within a range without departing from the essence of the present disclosure.

The numerical values and the like shown in the above embodiments are examples and are not limited thereto.

The calculation for obtaining a code for detecting an error in output data is not limited to CRC, and may be a calculation that is complicated to some extent (to some extent advanced calculation).

The first CRC calculation section 13 (which calculates the CRC calculation [1]) and the second CRC calculation section 14 (which calculates the CRC calculation [2]) may calculate CRC [1] and CRC [2], respectively, based on the same conversion original data, Even in this case, the CRC [1] and the CRC [2] are different in their calculation method, so that it becomes difficult to calculate the CRC [2] in the MCU 10 having only calculation functions similar to the first CRC calculation section 13.

The bus conversion IC 9 may include a processor and a memory (corresponding to a non-transitory tangible computer readable storage medium) such as RAM, ROM, that stores software. The MCU 10 may include a processor and a memory (corresponding to a non-transitory tangible computer readable storage medium) such as RAM, ROM, that stores software. The MCU 11 may include a processor and a memory (corresponding to a non-transitory tangible computer readable storage medium) such as RAM, ROM, that stores software.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While various embodiments, configurations, and aspects of an output control apparatus according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. An output control apparatus that controls opening and closing between an output terminal connected to an external apparatus and a power supply terminal to which power for the external apparatus is supplied, the output control apparatus comprising:

a first switching element and a second switching element that are connected in series between the power supply terminal and the output terminal;

a data generation portion that generates output data for turning on and off the first switching element and the second switching element based on a control command received from outside;

a first controller that controls drive of the first switching element; and a second controller that controls drive of the second switching element, wherein;

the data generation portion includes
  a first generation-side calculation section that calculates based on one or more predetermined conversion original data including the output data, first code data detecting an error in the output data, and
  a second generation-side calculation section that calculates based on the one or more predetermined conversion original data including the output data, second code data detecting an error in the output data and being different from the first code data;

the data generation portion transmits communication data acquired by adding the first code data and the second code data to the output data to the first controller by serial communication;

the first controller includes
  a first control-side calculation section that has only calculation functions similar to calculation function of the first generation-side calculation section between calculation functions of the first generation-side calculation section and of the second generation-side calculation section,
  a first error detection section that detects the error in the output data included in the communication data based on a calculation result of the first control-side calculation section, and
  a first drive portion that drives the first switching element based on the output data on condition that no error in the output data is detected by the first error detection section;

the first controller transmits the communication data received from the data generation portion to the second controller by serial communication;

the second controller includes
  a second control-side calculation section that has the calculation functions similar to the calculation functions in the second generation-side calculation section,
  a second error detection section that detects the error in the output data included in the communication data based on a calculation result of the second control-side calculation section, and
  a second drive portion that drives the second switching element based on the output data on condition that no error in the output data is detected by the second error detection section.

2. The output control apparatus according to claim 1, wherein:
  the first generation-side calculation section calculates the first code data based on a first conversion original data of the one or more conversion original data; and
  the second generation-side calculation section calculates the second code data based on a second conversion original data of the one or more conversion original data, the second conversion original data being different from the first conversion original data.

3. The output control apparatus according to claim 1, wherein:
  the first switching element and the second switching element both are turned on and off in a similar manner at a time when no data corruption in the communication data occurs.

4. An output control apparatus comprising:
  an output terminal that is connected to an external apparatus;
  a power supply terminal to which power for the external apparatus is supplied;
  a first switching element and a second switching element that are connected in series between the power supply terminal and the output terminal;
  such that the output control apparatus controlling opening and closing between the output terminal and the power supply terminal;
  a data generation portion that is configured to generate output data for turning on and off the first switching element and the second switching element based on a control command; and
  a first controller and a second controller that are configured to respectively control drive of the first switching element and the second switching element, wherein;

the data generation portion is configured to
  calculate based on one or more predetermined conversion original data including the output data, first code data detecting an error in the output data,
  calculate based on the one or more predetermined conversion original data, second code data detecting an error in the output data, the second code data being different from the first code data,
  add the first code data and the second code data to the output data to acquire communication data, and
  transmit the communication data to the first controller;

the first controller is configured to
  calculate based on the one or more predetermined conversion original data, only the first code data between the first code data and the second code data,
  detect the error in the output data included in the communication data based on a calculation result of the first code data calculated by the first controller, and
  transmit the communication data to the second controller;

the first controller includes a first drive portion that is configured to drive the first switching element based on the output data on condition that the first controller does not detect error in the output data;

the second controller is configured to
  calculate based on the one or more predetermined conversion original data, the second code data, and
  detect an error in the output data included in the communication data based on a calculation result of the second data calculated by the second controller; and the second controller includes a second drive portion that is configured to drive the second switching element based on the output data on condition that the second controller does not detect error in the output data.

5. The output control apparatus according to claim 4, wherein:
  the data generation portion is connected with the first controller via a communication path; and
  the data generation portion is not directly connected with the second controller via a communication path.

6. The output control apparatus according to claim 4, wherein:
  the one or more conversion original data includes a first conversion original data and a second conversion original data, the second conversion original data being different from the first conversion original data;

the first controller calculates the first code data based on the first conversion original data; and the second controller calculates the second code data based on the second conversion original data.

* * * * *